United States Patent [19]

Buelens et al.

[11] Patent Number: 4,865,196
[45] Date of Patent: Sep. 12, 1989

[54] LIGHT-CASSETTE FOR LIGHT-SENSITIVE PHOTOGRAPHIC MATERIAL

[75] Inventors: Edward Buelens, Kontich; Wilfried E. Muylle, Schoten, both of Belgium

[73] Assignee: AGFA-Gevaert N.V., Mortsel, Belgium

[21] Appl. No.: 206,766

[22] Filed: Jun. 15, 1988

[30] Foreign Application Priority Data

Jul. 6, 1987 [EP] European Pat. Off. ........ 87201278.6

[51] Int. Cl.$^4$ .................... B65H 16/02; G03B 17/26; G03B 27/58
[52] U.S. Cl. .................... 206/409; 242/71.1; 242/71.7; 354/275; 206/389
[58] Field of Search ............... 206/409, 389; 242/71.7, 242/71.1; 354/275

[56] References Cited

U.S. PATENT DOCUMENTS 4,068,247 1/1978 Bouwen et al. .................... 354/275
4,730,778 3/1988 Akad et al. .................... 206/409 X

FOREIGN PATENT DOCUMENTS 836714 10/1938 France .................... 242/71.1

Primary Examiner—Arnold Rosenthal
Attorney, Agent, or Firm—William J. Daniel

[57] ABSTRACT

A light-tight cassette for a roll of light-sensitive photographic material, comprising a shell (11) of generally rectilinear sectional profile with a light-tight dispensing slot (15) defined between two lips, has a stiffening member (33) inserted between at least one lip (21) of the dispensing slot and the adjacent shell wall (19), for increasing the bending resistance of said lip and minimizing accidental light leakage through the slot.

14 Claims, 4 Drawing Sheets

LIGHT-CASSETTE FOR LIGHT-SENSITIVE PHOTOGRAPHIC MATERIAL

DESCRIPTION

BACKGROUND OF THE INVENTION

1. Field of the Invention

The present invention relates to a light-tight cassette or magazine (hereinafter called "cassette") for holding a roll of light-sensitive photographic material.

The invention is particularly suitable for embodiment in a cassette for holding and dispensing a roll of photographic material for use in phototype-setting apparatus.

2. Description of the Art

Cassettes in the form of a rectanguloid box having a peripheral light-tight slot via which light-sensitive material can be drawn from a roll located in the box are known. The light-tightness of the dispensing slot is important for preventing light from entering the cassette and fogging outer convolutions of the roll of light-sensitive material when the cassette is removed from its wrapper and during day-light loading or unloading of the cassette into or from a photographic exposure apparatus.

Most present-day cassettes are made from plastics or cardboard and they are cheap to manufacture, are light in weight, and are easy to handle. The peripheral wall or shell of the cassette has in-turned lips forming the dispensing slot and light-tight sealing of this slot is effected by elastically deformable strips, e.g. strips of velvet. Provided that the length of the cassette is not too great, the sealing strips can be sufficiently elastically deformable by the pressure exerted by the light-sensitive material in the slot to compensate for any deformation of either of the shell lips which may occur, e.g. when photographic material is being pulled through the slot. Generally speaking, this compensation is capable of ensuring effective light-tightness of cassettes up to about 10 inches in length. At one time rolls of photographic material wider than 10 inches were not in common use but modern phototypesetting apparatus use wider photographic materials. Rolls between 10 and 13 inches in width are now often used and the trend is towards widths up to 20 inches. Practice shows that it is extremely difficult to produce cassettes with a dispensing slot 10 to 13" in length with lips which are sufficiently rigid to resist bending under forces to which they are subjected during ordinary use.

One reason why lip bending occurs is that when photographic material is withdrawn from the cassette it is forced to change direction on emergence from the dispensing slot. A component of force normal to the plane of the material in the slot is therefore exerted on one of the slot lips which tends to displace it away from the opposite lip.

Another cause of lip bending is careless handling of the cassette by the operator during removal of a sealing tape that is stuck over the dispensing slot of a new cassette. Usually one lip only of a cassette is prone to easy deformation and no harm is done if the sealing tape is pulled off the cassette in the direction towards the opposite lip. However, if the tape is pulled off in the other direction the less rigid lip can be deformed sufficiently to allow light to enter the cassette and cause fogging of the light-sensitive material.

Commonly used strips of velvet or the like for light-tightly sealing the dispensing slot can compensate for lip deflections of, say, maximum 1 mm but experience shows that this maximum value is easily exceeded in the case of cassettes longer than 12 inches.

It is known to increase the stiffness of a lip of a dispensing slot by folding or flaring an inner portion of the lip backwardly or outwardly to form a flange which is connected to the adjacent interior wall of the shell thereby to form a kind of hollow beam or tube (see e.g. DE-A-27 45 031). The bending resistance of the lip achieved in this way depends of course on the width and orientation of the flange. For such a stiffening flange to be reliable in the case of a cassette having a length of 12 inches or more, the flange would require to be of such width as to impose undesirable limitations on the choice of the slot location and orientation. In order to be compatible with certain currently marketed exposure apparatus, the cassettes from which the light-sensitive material is dispensed must have a dispensing slot located with its exit mouth very close to, e.g. 10 mm or less from, the plane of one of the side walls of the cassette, i.e., at a corner. When taking account of the most suitable orientations of the plane of the slot for avoiding awkward changes of direction of the light-sensitive material on arrival at the entrance to the dispensing slot within the cassette, this means that one lip of the dispensing slot has to be at a relatively small angle (an angle that may be less than 15°) to the adjacent side wall of the cassette shell. That is why most cassettes for phototypesetting photographic material have a dispensing slot with its exit mouth near a corner of the cassette shell and its lips orientated asymmetrically between the adjacent side walls of the shell. The slot lip which is at the smaller angle to its adjacent side wall is more susceptible to bending than the other lip. And obviously the closeness of that weaker lip to the cassette shell limits the width of stiffening flange which could be accommodated.

It is an object of the present invention to impart to a dispensing slot lip of a cassette for holding a roll of wide photographic material to be given an enhanced bending resistance while at the same time allowing the lip to be located close and at a small angle to an adjacent side of the cassette as above referred to.

SUMMARY OF THE INVENTION

In accordance with the present invention, there is provided a light-tight cassette for holding a roll of light-sensitive photographic material, comprising a shell of generally rectilinear, e.g., square profile in end elevation, and end caps for closing the shell ends, said shell having, at or near one vertex or corner, a dispensing slot between lips formed by inwardly projecting wall portions of the shell, which slot is provided with light-tight sealing means, characterised in that an separate stiffening member has been inserted and is held located between at least one of these lips and the adjacent side wall of the shell so as to increase the resistance of that lip to any bending forces which may tend to widen the slot.

The invention enables cassettes of light weight material such as thin plastics or cardboard, and having an effectively light-tight dispensing slot disposed in the specified manner in relation to the cassette shell, to be made considerably longer than was hitherto possible. For example, cassettes according to the invention can be long enough to hold films up to 20 inches or more in width.

Another advantage afforded by the invention is the fact that the greater resistance to lip bending and therefore to widening of the dispensing slot reduces reliance on the compensatory action of the elastically deformable light-sealing strips affixed to the lips. Therefore such strips need not exert such a strong biasing pressure against the light-sensitive material in order to form satisfactory light seals. It follows that these seals can offer less frictional resistance to withdrawal of the light-sensitive material from the cassette.

The effect of the stiffening member depends on two factors, viz. the moment of inertia of the member and its modulus of elasticity. The moment of inertia can be made considerably larger than that of the combination of the slot lip and the adjacent side wall of the shell, simply by forming the stiffening member from material of a sufficient thickness or gauge, but this may unacceptably affect the product cost. It is therefore generally better to use a stiffening member of a cross-sectional shape which gives a higher bending resistance for any given thickness of the material used. For example it is beneficial to use a member of V or T section or in the form of a tube of circular, rectangular or other cross-sectional profile.

The necessary gauge or thickness of the material of the stiffening member is also lower the higher is the modulus of elasticity of this material. Suitable materials for the stiffening member are metals, e.g. aluminium with a modulus of $7.5 \times 10^4 \text{N.mm}^{-2}$, and steel with a modulus of $20 \times 10^4 \text{N.mm}^{-2}$. Other suitable materials include composites of plastics and reinforcing fibres. The moduli of elasticity of commonly used cassette shell materials are much lower. For example hard polyvinylchloride has a modulus of $2,900 \text{N.mm}^{31\ 2}$.

The shell of a cassette according to the invention can for example have the square or nearly square external profile in end aspect, e.g. a profile corresponding with a square with truncated corners. As another example the shell can have a profile as is shown in DE-A-2745 031.

In a cassette in accordance with the invention, a free marginal portion of a lip with which each stiffening member co-operates can be directed away from the opposite lip and serve as a retaining flange or detent for said stiffening member to prevent it from becoming inadvertently displaced out of its stiffening position. This is a very convenient way of holding the stiffening member in proper location. The said retaining flange can even be extended to and joined with the adjacent side of the cassette shell so that the flange, its lip and the said adjacent shell side form a tubular passageway in which the stiffening member is located. This arrangement ensures a very secure retention of the stiffening member, which may for example be inserted endwise into said passageway following its formation. In addition the stiffness of the lip is promoted by the fact that it forms part of a tube which serves as a hollow beam.

Preferably the stiffening member is held in working position at least in part by clamping force exerted thereon by the co-operating lip and the adjacent side of the shell. In this case the stiffened lip is kept permanently pressed against the stiffening member by elastic recovery forces stored in the material of the shell when the stiffening member is fitted into its stiffening position.

One or each end of the stiffening member can be shaped to facilitate endwise insertion of the member into its stiffening position in the shell.

Advantageously, the stiffening member is longitudinally curved so that it exerts on the co-operating lip a biasing force which acts predominantly at the central region of the length of such lip.

A cassette according to the invention may be disposable, but the cassette may also be intended for reloading by the end user. Reloadable cassettes may be reloaded in the darkroom where the operator unwraps the roll of light-sensitive material and inserts the roll in the opened cassette. Reloadable cassettes may alternatively be reloaded in daylight if the light-sensitive material is wrapped in a wrapping with a tongue-like extension that permits loading of the cassette without loss of the light-tightness of the roll of material, prior to removal of the light-tight wrapping by exerting a pull on the tongue, as disclosed for instance in US-A-4,148,395 entitled "Roll package".

The roll of photographic material may be rotatably journalled in the cassette via hub portions which may form parts of the end caps. Alternatively a roll of material may be journalled by means of separate end pieces provided in the cassette. The invention also includes cassettes wherein a roll of material is held in the form of a coreless roll.

In the most important embodiments of the invention the dispensing slot is orientated asymmetrically in a vertex or corner of the shell (the angles between the two lips and their respective adjacent shell sides consequently being unequal), and a said stiffening member is located so as to increase the bending resistance of that one of the lips which makes the smaller angle with its respective adjacent side of the shell. Such embodiments of the invention take particular advantage of the ability of the invention to stiffen a lip which is at a relatively small angle to the adjacent side of the shell.

Whereas reference has so far been made to the stiffening of one lip of the dispensing slot, it is to be understood that both of the dispensing slot lips of a cassette according to the invention can be stiffened in a similar manner if so desired.

BRIEF DESCRIPTION OF THE DRAWINGS

Certain embodiments of the invention, selected by way of example, will now be described with reference to the accompanying drawings, wherein.

Figure 1:
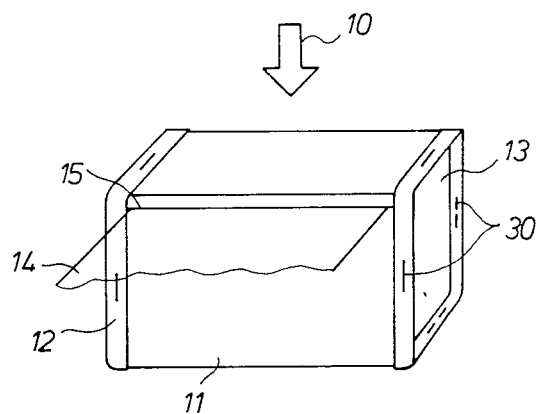
FIG. 1 is a perspective view of a cassette according to the invention.

The cassette 10 shown in FIG. 1 comprises a shell 11 and two end caps 12 and 13. The cassette holds a roll of photographic material 14 from which material is pulled through a dispensing slot 15 which extends axially of the cassette between the two end caps. In this figure, the photographic material has been illustrated as being transparent.

Figure 2:
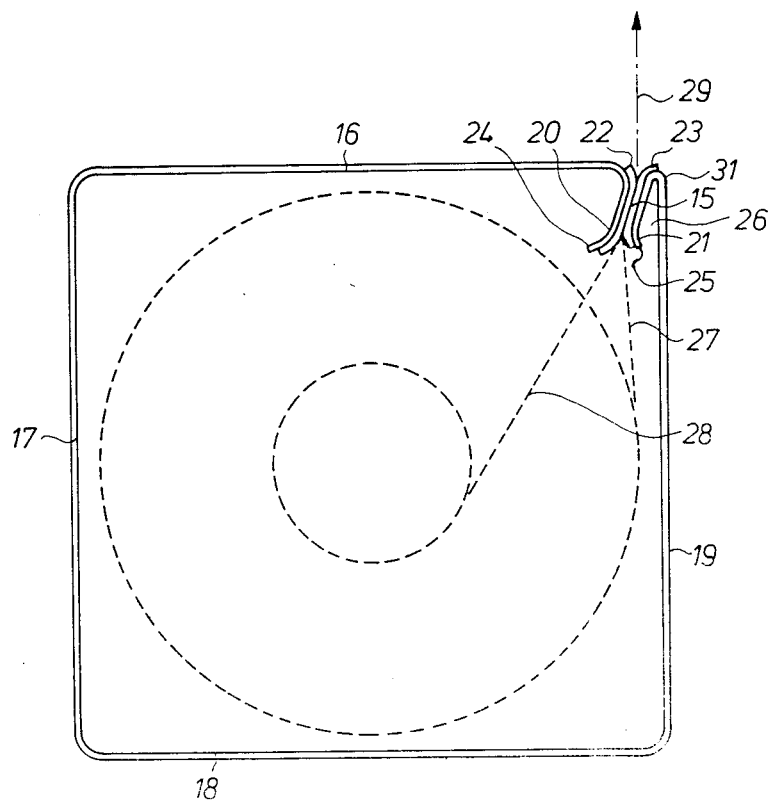
FIG. 2 is a end view of the shell of the cassette of FIG. 1, a roll of film being illustrated in dashed lines.

The shell 11 is shown in detail in FIG. 2. The shell is of generally square external profile in end elevation, being formed by four sides 16 to 19 joined by rounded corner portions. At one corner or vertex of the shell, portions of the shell wall are bent inwards to form two lips 20, 21 defining the dispensing slot 15. Resilient strips 22, 23 line the opposed surfaces of the lips 20, 21 so as to light-tightly seal the dispensing slot and to provide a smooth passageway for the photographic material. The strips may be made from velvet or a like material with natural or synthetic pile fibres, or from soft and compressible foam ribbons which may be provided with fabric wraps. At their inner ends lips have outwardly curved end portions 24,25 in order to provide a flared entrance to the dispensing slot to promote smooth travel of the web from the roll of photographic material into the dispensing slot whether from a fresh roll as indicated by the broken line 27 or from a nearly consumed roll as indicated by the broken lines 28.

The dispensing slot 15 is located in the shell so that on emergence from the cassette the web of photographic material can follow a path indicated by the arrow 29 which is close to and parallel with the plane of the adjacent side 19 of the cassette shell. This feature makes the cassette compatible with the design of the cassette-receiving station of common phototype-setting apparatus.

The shell 11 is particularly suitable for manufacture from plastics by extrusion. This manufacturing technique enables shells of any required length to be cut from an extruded length of appropriate cross-sectional profile. An example of a suitable plastics for the shell is polyvinylchloride.

The end caps may comprise an end wall having inner and outer peripheral wall portions defining a peripheral groove for receiving an end portion of the shell. The end caps are preferably made from plastics by injection moulding or vacuum moulding. Further description of the end caps is unnecessary for the understanding of the present invention. More information about suitable end caps can be found in U.S. Pat. Nos. 4,068,247 and 4,291,802.

The end caps can be fastened to the shell by any known technique, such as by glueing, taping, stapling or nailing. In the embodiment illustrated in FIG. 1, the caps are fitted to the shell by means of staples 30.

The precise width of the dispensing slot (i.e. the distance between the mutually facing surfaces of the lips 20 and 21) is determined principally by the end caps since their engagement with the shell ends determines the exact position of the ends of the lips.

If neither of the lips 20 and 21 were subjected to forces tending to spread them apart and widen the dispensing slot the width of the slot would remain uniform over its full length, even in the absence of any stiffening member. However in actual practice the film particularly when tensional unwinding exerts forces which, due to the length of the cassette and the limited rigidity of the shell wall portions forming the lips 20 and 21, tend to cause the lips to bend with the result that the width of the slot increases from a nominal value at the ends of the slot to a maximum value at the centre of its length.

One cause of this lip bending even when the film is not tensioned is the pressure caused by the light sealing means provided in the dispenser slot. In the illustrated embodiment this sealing means is formed by the strips 22,23, but such pressure would of course be exerted if sealing means of some other type were used, e.g. sealing means in the form of small flexible lips such as are disclosed e.g. in U.S. Pat. No. 4,616,914.

The bending of the lip 20 is minimal, because it has a relatively good bending resistance in consequence of its connection with the shell side 16 at an angle of approximately 90 degrees. Any bending of this lip which does occur can be compensated for by expansion of the sealing strips 22,23. On the other hand, unless lip 21, which is connected at a relatively small angle to shell side 19, were stiffened, it would be liable to bend in excess of the compensating action of the sealing strips with the result that light could penetrate into the cassette between the film and sealing strip 23.

In order to make lip 21 more resistant to bending it is stiffened by means of an elongated stiffening member 32 disposed between this lip and the adjacent side 19 of the shell.

Figure 3:
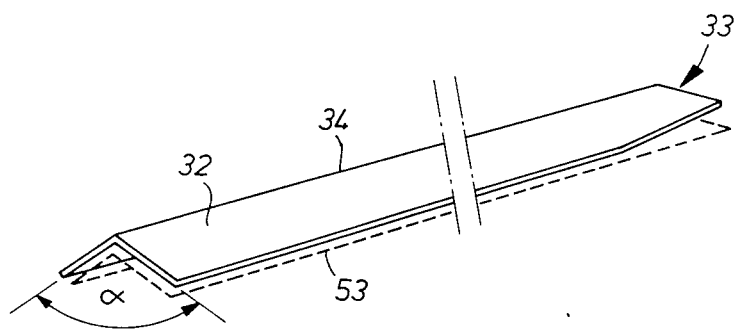
FIG. 3 shows one form of stiffening member for insertion into the cassette shell.
Figure 4:
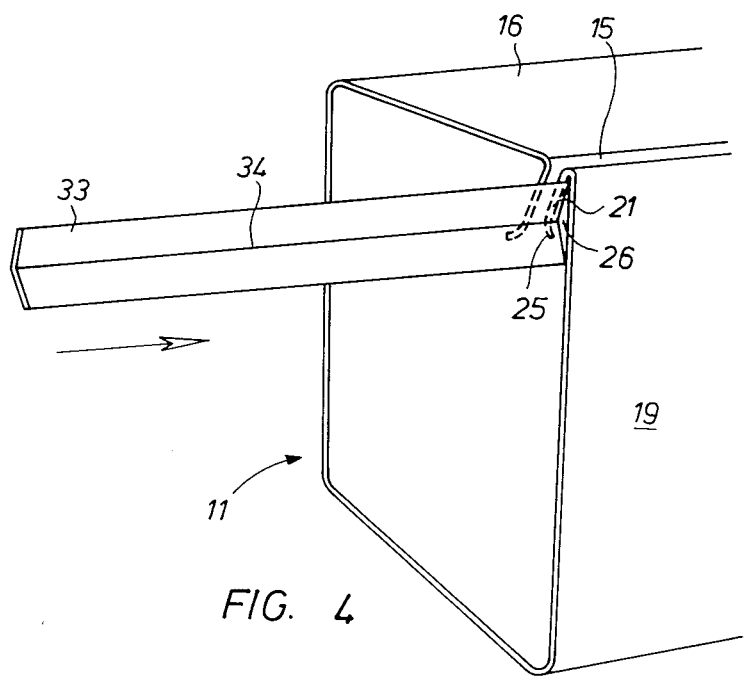
FIG. 4 shows this stiffening member in course of being inserted in the shell.

The stiffening member 32, shown in FIGS. 3 and 4, comprises a rectangular strip of sheet metal which has been bent about its longitudinal centreline to give it a V profile having an internal angle ALPHA of approximately 120 degrees. The length of the strip corresponds with the length of the shell of the cassette. One end of the stiffening member is somewhat flattened as shown at 33 where the fold angle increases progressively from 120 to about 180 degrees over a length of approximately 20 mm. This measure facilitates the insertion of the stiffening member into the shell as illustrated in FIG. 4. The mounting of the stiffening member occurs in daylight rather than a darkroom so that the operator can easily check whether its positioning is correct. The member is held firmly in place by engagement of its ridge 34 behind a retaining flange formed by the outwardly directed margin 25 of the lip 21.

Figure 5:
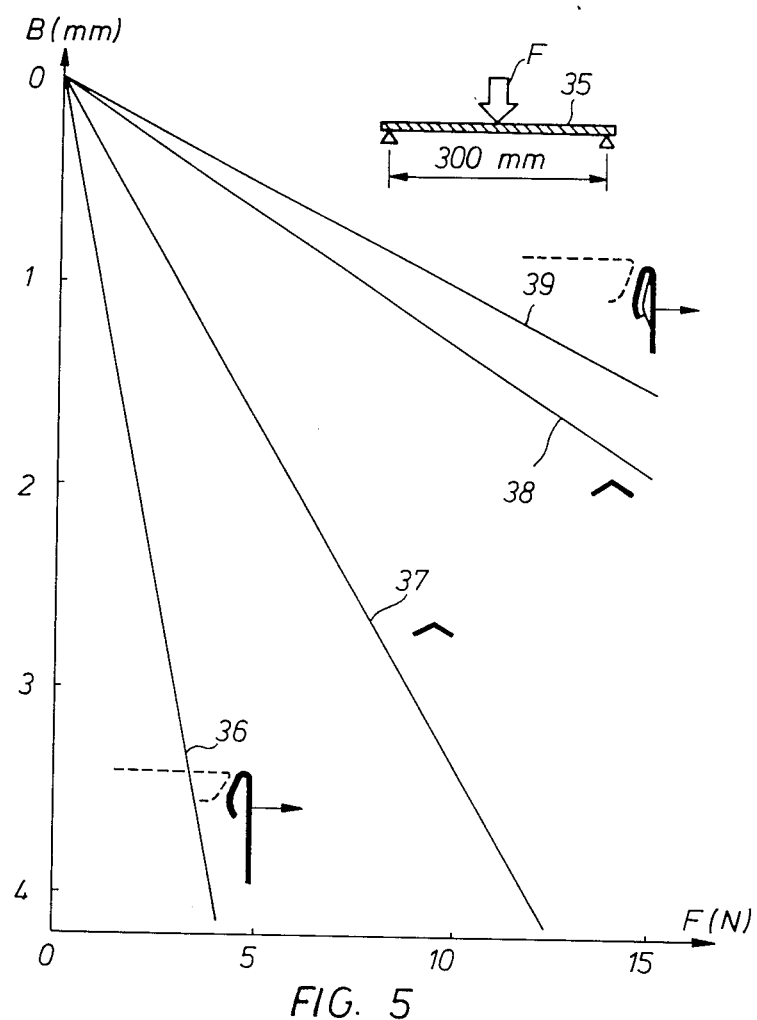
FIG. 5 is a graph representing the bending resistance imparted by the use of different stiffening members.

The diagram of FIG. 5 compares the bending resistance of a cassette lip 21 that was reinforced in accordance with the invention with that of an unreinforfed lip and with that of different stiffening members. The cassette measured 4×4×12 inches, and the shell was made from PVC and had a wall thickness of 1.3 mm.

The abscissa of the diagram shows the loading force F in Newtons and the ordinate shows the increase in lip bending B in mm. The value B represents the extent of deflection of the lip at its central point.

The cassette was placed horizontally on supporting blocks disposed under the end caps, the side 19 facing downwardly, so that the lip could be regarded as a horizontal beam supported at both its ends (see the insert picture in the diagram of a beam 35). The bending was caused by applying a downwardly directed bending force F on the lip halfway along its length via a small hook which was engaged in the slot. Displacements of the lip were measured by means of a clock micrometer.

The curve 36 relates to the lip of the cassette without the reinforcing stiffening member. It will be seen that a load of 2.5N causes a lip bending of 2.5 mm. A bending of 2.0 mm is considered as an upper limit above which fogging of the film would be liable to occur.

The curve 37 represents the bending resistance of a stiffening member formed from an aluminium strip having a length of 300 mm and a thickness of 1 mm by itself. The strip had been folded to a V profile with an internal angle of 120 degrees. The width of the profile (distance between its free longitudinal edges) was 15 mm.

The curve 39 represents the bending resistance of the cassette lip after it was provided with this stiffening member.

Figure 6:
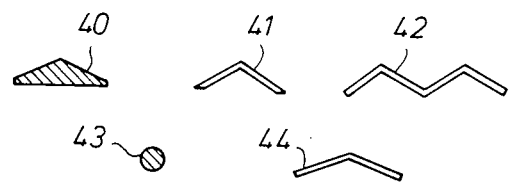
FIG. 6 shows stiffening members of different cross-sectional profile.

FIG. 6 represents various suitable forms of stiffening members. The member 40 is a solid section aluminium bar having a width (width of its widest face) of 15 mm and a thickness (measured normally to that face) of 4 mm. The member 41 is an aluminium strip 1.2 mm in thickness which has been formed to a V-shaped profile having a width of 15 mm and a depth of 4 mm. The member 42 is an aluminium strip folded to a W-shaped profile measuring 30×4×1.2 mm. The member 43 is a solid steel rod with a diameter of 4 mm. Member 44 is a flattened V-shaped steel strip 1 mm in thickness, folded to a profile measuring 15×4 mm.

The following table illustrates the bending values B (as hereinbefore defined) measured on 30 cm lengths of such members, under loading forces applied at a central point of the members.

TABLE

| F (N) | Bending (mm) | | | | |
|---|---|---|---|---|---|
| | 40 | 41 | 42 | 43 | 44 |
| 2 | 0.2 | 1.1 | 0.6 | 0.6 | 0.2 |
| 3 | 0.35 | 1.5 | 0.8 | — | 0.2 |
| 4 | 0.6 | 2.0 | 1.1 | 1.7 | 0.4 |
| 5 | 0.8 | 2.1 | 1.4 | — | 0.5 |
| 6 | 0.8 | 2.4 | 1.7 | 2.3 | 0.6 |
| 7 | 1.0 | 2.8 | 2.0 | — | 0.75 |
| 8 | 1.2 | 3.1 | 2.3 | 2.9 | 0.9 |
| 9 | 1.4 | 3.2 | 2.7 | — | 1.1 |
| 10 | 1.5 | 3.5 | 2.9 | 3.5 | 1.2 |
| 11 | 1.6 | 3.8 | 3.1 | — | 1.3 |
| 12 | 1.8 | 3.9 | 3.5 | 4.3 | 1.4 |
| 13 | 2.0 | 4.6 | 3.7 | — | 1.6 |
| 14 | 2.25 | 4.8 | 4.0 | 4.9 | 1.7 |
| 15 | 2.45 | 5.0 | 4.3 | 5.1 | 1.9 |

The dashes in the column 43 indicate that no measurements were made at the relevant loads.

Figure 7:
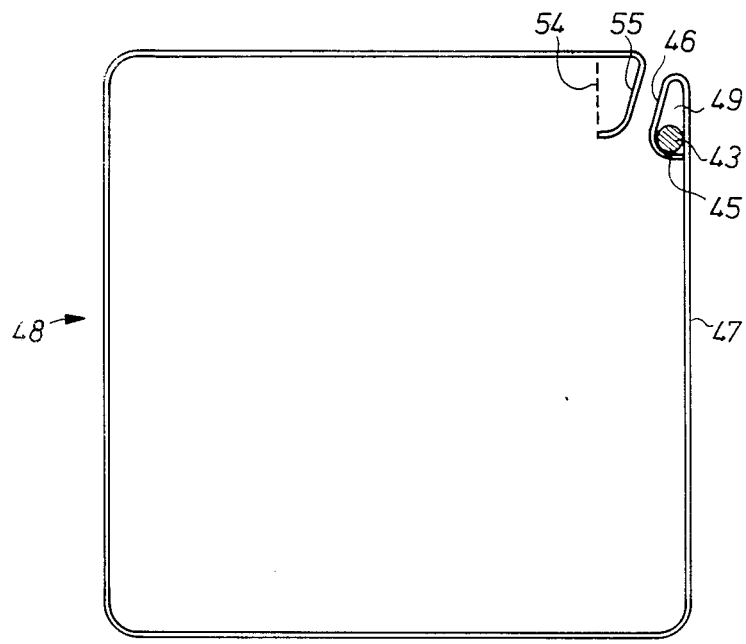
FIG. 7 shows the shell of a modified cassette according to the invention with a stiffening member in position.

The shell of a modified cassette according to the invention, fitted with a lip stiffening member, is shown in FIG. 7. The inner margin of the wall portion forming the lip 46 is directed outwardly to form a flange 45 which extends up to the adjacent side 47 of the shell 48 and is connected therewith so that a tube 49 is formed having a roughly triangular cross-section. The shell is preferably formed as an extrusion so that the flange 45 is integral with the shell side 47. A stiffening member in the form of a rod 43 is inserted along the tube 49. The diameter of this rod is such that it is lightly clamped or wedged between the lip 46 and shell side 47.

Figure 8:
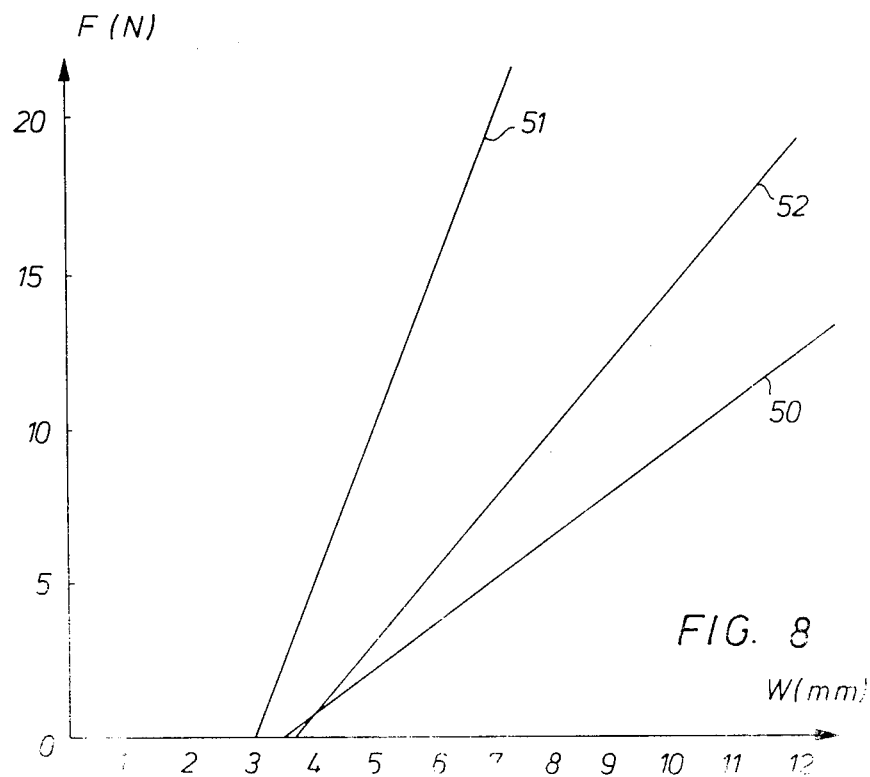
FIG. 8 is a graph representing the bending resistance of a lip of the modified cassette according to FIG. 7, with and without its stiffening member.

This embodiment has the advantage that the stiffening member is fully enclosed by the retaining flange 45 so that under no circumstances can the stiffening member fall into the interior of the cassette, e.g. in the event of the cassette falling on the floor. Changes in the width of the slot of a 12" cassette in accordance with FIG. 7 under different loading forces applied halfway along the length of the lip 46 are represented in the graph of FIG. 8 wherein the abscissa represents the slot width W in mm and the ordinate represents the loading force in Newtons. For the purpose of the measurements, the dispensing slot was not provided with light-sealing means. The curve 50 relates to a cassette as illustrated in FIG. 2, whereas the curve 51 relates to the cassette according to FIG. 7, the steel rod having a diameter of 4 mm. The graph shows that the bending resistance of the lip is increased by a factor 2, judging for instance from the respective slot widths of 10 and 5 mm at a loading of 10N. The structure of the tube 49 itself is to some extent also responsible for the increased rigidity of the cassette lip, as illustrated by the curve 52 which relates to a cassette in accordance with FIG. 7, but without the stiffening member 43.

The present invention is not limited to the illustrated embodiments.

A cassette according to the invention can be provided with stiffening members for both slot lips rather than just for one of the lips.

Use can be made of one or more stiffening members of a form or forms other than the profiles or rod-like forms illustrated. For example such a member may have a T- or X profile, or it may be of tubular form with a circular, triangular, rectangular or other cross-section as already mentioned.

The stiffening member or members need not be made of metal. Such a member can e.g. be made from plastics having a modulus of elasticity that is higher than that of the material of the shell, or from plastics reinforced by suitable fibers or wires.

In cases in which the retaining flange for a stiffening member does not extend right up to the neighbouring side of the cassette shell as in FIG. 7, i.e., to form a tubular housing for the stiffening member, the secure location of the stiffening member can be improved by the provision of a ridge or shoulder (not shown) on the inner face of that neighbouring shell side.

A stiffening member may be curved or angled in the longitudinal direction thereby to provide a biasing force against the co-operating lip which is greatest half way along the length of such lip. This measure further contributes to reducing the risk of entrance of light through the dispensing slot. Such a curvature is indicated by the broken lines 53 in relation to the stiffening member shown in FIG. 3. The stiffening member can be curved or angled to suit the individual case, e.g. it can be bent to an angle at one point or it may follow a parabolic curve.

Each of the slot lips of a cassette according to the invention can have an integral flange extending right up to the neighbouring side of the cassette shell (see the broken line 54 for the lip 55 in FIG. 7). In the latter case an inserted stiffening member can be associated with each lip or with only one of them. The dispensing slot may be located at 45° or any other desired angle to the neighbouring sides of the cassette shell. The slot may alternatively be parallel with either of those shell sides. The two lips can be identical to each other.

The lips of the slot may have straight portions that run strictly parallel with each other, as illustrated in the cross-sectional view of FIG. 2. As an alternative the lips can have be slightly curved over their widths.

The shell of a plastics cassette according to the invention may be manufactured by injection moulding instead of by extrusion. The shell of a cardboard or fiberboard cassette may be obtained by folding of an appropriate cut and scored blank.

A cassette according to the present invention and manufactured from plastics material, can as such be sufficiently moisture-proof for the purposes primarily in view. In the case of certain types of photographic material which are particularly sensitive to moisture, the cassette containing a roll of fresh material may be hermetically sealed in a suitable wrapper, e.g. a laminated wrapper consisting of bonded layers of paper, aluminium and polyethylene. Such wrapper will provide effective protection against moisture during normal storage of the cassette. For occasional reloading of a cassette by the user, fresh rolls of photographic material be can supplied by the manufacturer of such materials, in such a moisture-proof wrapper.

We claim:

1. A light-tight cassette (10) for holding a roll of light-sensitive photographic material (14), comprising a shell (11,48) of generally rectilinear external profile in end aspect, and end caps (12,13) for closing the shell ends, said shell having, at or near one vertex, a dispensing slot (15) between lips (20,21;46,55) formed by inwardly projecting wall portions of the shell, which slot (15) is provided with light-tight sealing means (22,23), characterised in that an elongated stiffening member (32,43) is engaged between at least one of said lips (21,46) and the adjacent side (19,47) of the shell so as to increase the resistance of that lip to any bending forces which may tend to widen the slot.

2. A cassette according to claim 1, wherein a free internal marginal portion (25,45) of said one lip (21,46) is directed away from the other lip and serves as a detent which prevents said stiffening member from becoming inadvertently displaced out of its stiffening position.

3. A cassette according to claim 2, wherein said detent (45) extends to the adjacent side (47) of the shell (11,48) so that said flange (45), its lip (46) and said adjacent shell side (47) form a tubular passageway (49) in which said stiffening member (43) is located.

4. A cassette according to claim 1, wherein said stiffening member (32,43) is engaged at least in part by clamping force exerted thereon by the co-operating lip (21,46) and the adjacent side (19,47) of the shell (11,48).

5. A cassette according to claim 1, wherein said stiffening member (34) is longitudinally curved (53) so that it exerts on the co-operating lip (21) a biasing force which acts predominantly at the central region of the length of such lip.

6. A cassette according to claim 1, wherein one end (33) of said stiffening member (34) is shaped to facilitate endwise insertion of the member into its stiffening position in the shell (11,48).

7. A cassette according to claim 1, wherein said stiffening member is in the form of a metal rod (34).

8. A cassette according to claim 1, wherein said stiffening member is in the form of a profiled metal bar (40,41,42,43,44).

9. A cassette according to claim 1, wherein said stiffening member is of tubular form.

10. A cassette according to claim 1, wherein said slot (15) is oriented asymmetrically in said vertex, whereby the angles between the different lips (20,21;46,55) and their respective adjacent shell sides (16,19;47,56) consequently being unequal, and wherein said stiffening member (33,43) is located so as to increase the bending resistance of that one of the lips which is at the smaller angle to its respective adjacent side of the shell.

11. A cassette according to claim 1, wherein a stiffening member is engaged between both lips and the adjacent sides of the shell so as to increase the bending resistance of both lips.

12. A cassette according to claim 1, wherein there is at least one said stiffening member is of angular configuration and has a modulus of elasticity which exceeds that of the material of the shell (11,48).

13. A cassette according to claim 1, wherein the shell (11,48) is a plastics extrusion.

14. A cassette according to claim 1, wherein the end caps (12,13) are plastics injection mouldings.

* * * * *